No. 737,488. PATENTED AUG. 25, 1903.
J. H. RIVERS.
LOCK NUT.
APPLICATION FILED JUNE 27, 1903.
NO MODEL.

Witnesses: Inventor:
Julian H. Rivers,
J. H. Gibbs by Bakewell & Cornwall
attys.

THE NORRIS PETERS CO., PHOTO-LITHO., WASHINGTON, D. C.

No. 737,488. Patented August 25, 1903.

UNITED STATES PATENT OFFICE.

JULIAN H. RIVERS, OF ST. LOUIS, MISSOURI.

LOCK-NUT.

SPECIFICATION forming part of Letters Patent No. 737,488, dated August 25, 1903.

Application filed June 27, 1903. Serial No. 163,391. (No model.)

*To all whom it may concern:*

Be it known that I, JULIAN H. RIVERS, a citizen of the United States, residing at St. Louis, Missouri, have invented a certain new and useful Improvement in Lock-Nuts, of which the following is a full, clear, and exact description, such as will enable others skilled in the art to which it appertains to make and use the same, reference being had to the accompanying drawings, forming part of this specification, in which—

Figure 1:
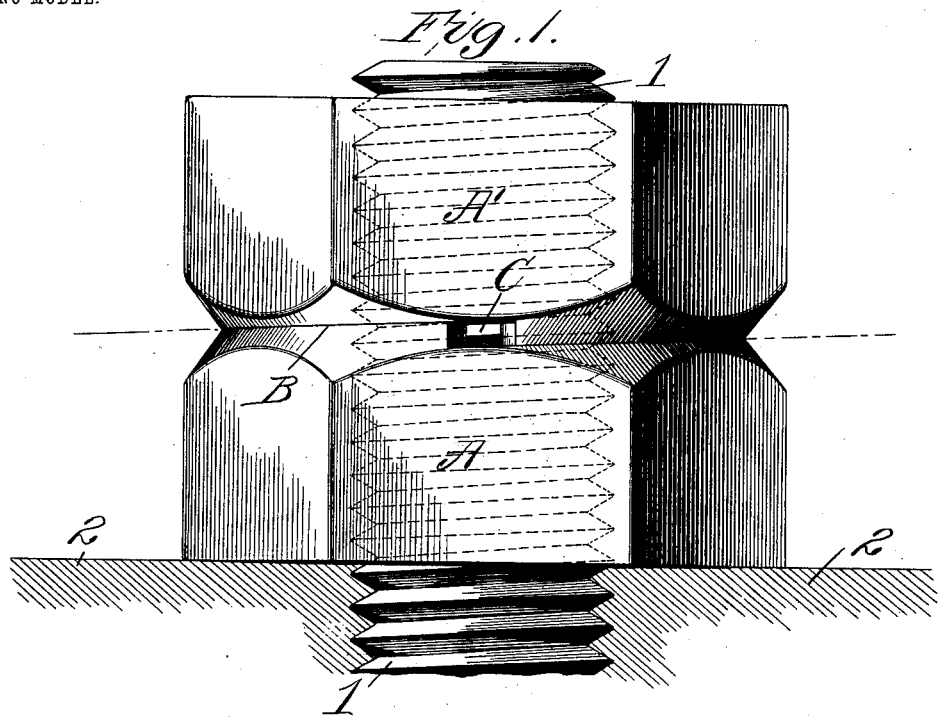
Figure 2:
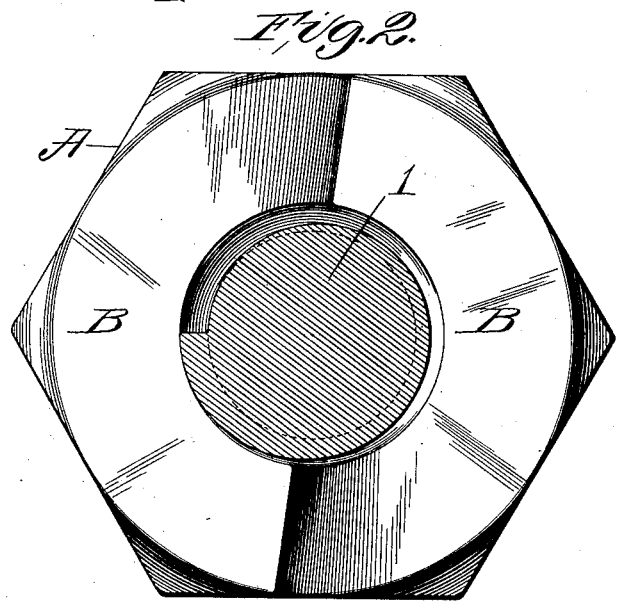

Figure 1 is a side elevational view of the invention, and Fig. 2 is a face view of one of the nuts.

This invention relates to a new and useful improvement in lock-nuts, the object being to produce a nut by the common methods of manufacture without extra operations and at minimum expense which may be used singly, as ordinary nuts, or in pairs, as lock or check nuts, as required.

To this end the nut-lock consists of two members alike and interchangeable and so calculated that the necessary engaging surfaces may be formed in the same press and at the same operation as that of blanking or perforating the nut and so tapped as to bring the engaging surfaces into locking position when two are placed face to face.

In Fig. 1 of the drawings the nuts are illustrated in locked position upon a projecting bolt 1, which for convenience of illustration is let into a suitable base portion 2. In connection with this figure of the drawings I wish to call attention to the fact that the locking-surfaces of these nuts are such as may be produced in presses during the operation of blanking or perforating by slight alteration of the blanking or perforating die, and as there are limitations to the power of such presses for rapid and economical production many nuts designed as lock-nuts cannot be made in this manner, but require separate operations often by separate machines for the finishing, which finishing is necessarily so expensive as to prevent the commercial success of many designs for this purpose which appear otherwise desirable.

I am aware that a great variety of nut-locks have been designed and lock-nuts which are designed to be screwed upon the bolt in pairs, both members being applied at the same time, are common, though to secure the locking effect one of the pair is generally turned backward or slightly unscrewed to bring the opposing spiral surfaces into frictional contact. If the inner nut is not moved by this reverse motion of the outer, such nuts may be efficient; but they are frequently moved and the entire scheme of the nut-lock is defeated. I have therefore designed this present invention by means of which the inner nut may be screwed home and the outer one applied at any convenient time, said outer one being screwed up until its differential faces come into contact with those of the inner nut, when a slight continuation of the turn locks the inner nut securely in place. To accomplish the object, the nuts of whatever external shape, (as square, round, or hexagonal,) having one face, as usual, in a plane perpendicular to the axis are provided on the other face with one or more spiral planes having the same direction of turn, but of less pitch than that of the threads of the central opening, said spiral planes having the same axis as the said threaded central portion.

The degree of pitch and direction of turn are important to the success of the scheme of my invention, and it is essential that the pitch of such spiral surfaces shall be less than that of the thread of the nut. Were these spiral surfaces of greater pitch or of different direction of turn, the locking action would be less efficient than that of two plain nuts. To secure this difference of pitch, the blanks are formed with predetermined spiral planes or differential surfaces, and these being known the central threads are produced with greater pitch. It is also necessary that the central thread shall enter the differential surface at a certain angle with reference to the ends of the spiral planes.

In the drawings, A and A' are nuts. B represents the faces of the spiral planes thereon, and C the opening generally remaining after the outer nut A' is screwed home upon the inner nut A. In practice the nut A is screwed firmly into place with the differential face outward. The outer nut A' is then or at any convenient time screwed upon the same bolt with its differential face inwardly, and when in the course of turning on nut A' its differential faces come into contact with those of nut A a slight continuation of the turn in the same direction locks both nuts firmly into place. If, for illustration, the bolt pitch be 12 and the differential faces 14, the nut A' tightens against nut A, as of pitch 84, and any to-and-fro motion of the joint so formed or heavy jarring tending to move the innermost nut would in one direction force it more tightly on its seat and in the other direction more tightly upon the outer nut A', and no means other than the spiral planes or differential faces formed as specified are necessary to secure a firm and durable lock. The spiral planes are such as can readily be produced during the regular operations of manufacture, and the nuts may be unlocked without injury to the nuts or bolts. Thus it will be apparent that the nuts may be manufactured in quantities, all those of a size being identical in contour, so that a single nut may be used, if desired, or any two may be caused to coöperate to produce the result desired, no sorting out of parts being necessary to find coöperative pairs, as in previous inventions in this line.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. A nut having one face composed of one or more spiral planes having the same direction of turn but of lesser pitch than that of the internal threads thereof and axially coincident therewith; said nut being so formed that it may be used singly, or in pairs with the spiral planes in juxtaposition, in which latter case the tightening of the outer nut upon a bolt will cause said differential faces to bind against the adjacent portion of the other nut, substantially as described.

2. A nut having one face composed of one or more spiral planes having the same direction of turn and of lesser pitch than that of the internal threads thereof, said nut being so tapped or threaded as to cause a differential engagement of the said spiral planes when placed face to face in pairs and the outer nut is rotated in a direction to screw the same upon a bolt; substantially as described.

3. The combination of two screw-threaded nuts, their opposite faces being substantially parallel, and their adjacent faces each being provided with differential areas one of which is inclined at a pitch less than the pitch of the screw-threads of said nuts but in the same direction of turn; substantially as described.

4. The combination of two screw-threaded nuts, adapted to be used either singly or in pairs, each of said nuts having an integral inclined, wedge-like projection extending from one face thereof, the pitch of said wedge being less than the pitch of the screw-thread formed in said nuts but in the same direction of turn and adapted to lock when rotated in the same direction; substantially as described.

5. The combination of two screw-threaded nuts adapted to be used singly or in pairs, each of said nuts having a plurality of integral wedge-like projections extending in the same direction of turn and in the general direction of the pitch of the screw-threads, the pitch of said wedges being less than the pitch of the screw-threads of said nuts, whereby when said nuts are placed with their differential faces next one another, the tightening of the outer nut upon a bolt will cause said differential faces to bind against the adjacent portion of the other nut; substantially as described.

In testimony whereof I hereunto affix my signature, in the presence of two witnesses, this 22d day of June, 1903.

JULIAN H. RIVERS.

Witnesses:
FREDERICK H. GIBBS,
GEORGE BAKEWELL.